US008880237B2

(12) United States Patent
Boss et al.

(10) Patent No.: US 8,880,237 B2
(45) Date of Patent: Nov. 4, 2014

(54) INTELLIGENT ROAD SIGNS

(71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/734,312

(22) Filed: Jan. 4, 2013

(65) Prior Publication Data

US 2014/0195068 A1 Jul. 10, 2014

(51) Int. Cl.

| | |
|---|---|
| ***G06F 7/00*** | (2006.01) |
| ***G06G 7/76*** | (2006.01) |
| ***G08G 1/00*** | (2006.01) |
| ***G06F 19/00*** | (2011.01) |

(52) U.S. Cl.

CPC .................................... *G06F 19/00* (2013.01)
USPC .............................................. 701/1; 701/117

(58) Field of Classification Search

USPC ............. 701/1, 117; 348/148–9; 40/584, 612; 382/104–5; 340/539.22, 539.26, 691.1, 340/691.6, 905, 907–8, 936–7, 939
See application file for complete search history.

(56) References Cited

U.S. PATENT DOCUMENTS

| | | | | | |
|---|---|---|---|---|---|
| 5,982,278 | A * | 11/1999 | Cuvelier | ........................ | 340/436 |
| 6,161,071 | A * | 12/2000 | Shuman et al. | ................. | 701/48 |
| 6,688,028 | B2 * | 2/2004 | Backe | ............................. | 40/612 |
| 7,010,397 | B1 * | 3/2006 | Pfleging et al. | .................... | 701/1 |
| 7,057,532 | B2 * | 6/2006 | Shafir et al. | .................... | 340/988 |
| 7,148,813 | B2 * | 12/2006 | Bauer | ........................... | 340/907 |
| 7,990,286 | B2 * | 8/2011 | Shankwitz et al. | ........... | 340/988 |
| 8,036,820 | B2 | 10/2011 | Sera | | |
| 8,138,948 | B1 * | 3/2012 | Votava et al. | ................. | 340/927 |
| 8,233,670 | B2 * | 7/2012 | Moed et al. | .................... | 382/113 |
| 8,446,293 | B2 * | 5/2013 | Stadjuhar et al. | ............. | 340/907 |
| 2010/0318261 | A1 | 12/2010 | Nagatomo | | |
| 2010/0321206 | A1 | 12/2010 | Kuga et al. | | |
| 2011/0010443 | A1 | 1/2011 | Nagatomo | | |
| 2012/0046855 | A1 * | 2/2012 | Wey et al. | ...................... | 701/117 |
| 2012/0150428 | A1 * | 6/2012 | Niem et al. | .................... | 701/409 |

OTHER PUBLICATIONS

O. Gusikhin "Emotive driver advisory system", ICINCO 2010, Proceedings 7th International Conference on Informatics in Control, Automation and Robotics, 33-4, 2010, 1 page.

(Continued)

*Primary Examiner* — Yonel Beaulieu
(74) *Attorney, Agent, or Firm* — William Schiesser; Roberts Mlotkowski Safran & Cole, P.C.

(57) ABSTRACT

An approach is provided for providing customized information to a driver of a vehicle. The approach is implemented in a computer infrastructure having computer executable code on a computer readable storage medium having programming instructions operable to: obtain one or more parameters of a vehicle; obtain environmental conditions outside of the vehicle; and calculate a speed at which the vehicle should traverse a portion of a road. The calculating is based on the one or more parameters of the vehicle and the environmental conditions outside of the vehicle. The approach is further operable to provide the calculated speed to the vehicle.

24 Claims, 4 Drawing Sheets

(56) References Cited

OTHER PUBLICATIONS

Wang et al. Smart Cars on Smart Roads: An IEEE Intelligent Transportation Systems Society Update', Pervasive Computing, Published by IEEE CS and IEEE ComSoc, 2006 IEEE, 2 pages.
Festag et al. "Vehicle-to-Vehicle and Road-Side Sensor Communication for Enhanced Road Safety", NEC Laboratories Europe, 12 pages, Oct. 21, 2011.
Lorsakul et al. "Traffic Sign Recognition for Intelligent Vehicle/Driver Assistance System Using Neural Network on OpenCV", the 4th International Conference on Ubiquitous Robots and Ambient Intelligence (URAI 2007), 6 pages.
Anonymous "Dynamic speed limits", European Road Safety Observatory, 2007, 1 page.
Anonymous "Electronic speed limit signs change with traffic" by Associated Press, kgw.com, posted on May 28, 2011, 1 page.
TED Conversations, 5 pages, Jun. 16, 2011.
Zhang et al. "Enabling Distributed Vehicular Traffic Control and Safety Applications with VGrid", University of California, Davis, 3 pages.

* cited by examiner

INTELLIGENT ROAD SIGNS

TECHNICAL FIELD

The present invention generally relates to computing systems, and more particularly, to systems and methods for providing customized information to a driver of a vehicle.

BACKGROUND

Road signs are generally static indicators of road conditions and required road speeds for traveling vehicles. These signs are generally good indicators of what speeds a normal four wheel passenger vehicle should traverse a curve or other road configurations. These signs provide warnings of upcoming road configurations, e.g., curve ahead, as well as potential dangers, e.g., falling rocks, slippery when wet, bridge ices before road, etc.

Some signs are known to provide additional information, from a central traffic control station. These signs can provide indications of traffic patterns, accidents and detours, etc. These signs, though, require input from a central station, and require personnel that are at the scene or cameras that can monitor the particular road conditions. However, these signs only provide general information for the masses of vehicles.

SUMMARY

In an aspect of the invention, a method is implemented in a computer infrastructure having computer executable code tangibly embodied on a computer readable storage medium having programming instructions operable to obtain: one or more parameters of a vehicle; obtain environmental conditions outside of the vehicle; and calculate a speed at which the vehicle should traverse a portion of a road. The calculating is based on the one or more parameters of the vehicle and the environmental conditions outside of the vehicle. The programming instructions are also operable to provide the calculated speed to the vehicle.

In an aspect of the invention, a system is implemented in hardware, comprising: one or more sensors which are configured to obtain environmental conditions; one or more transceivers which are configured to obtain at least one vehicle parameter of a vehicle traversing a portion of a road; and a calculating unit which is configured to calculate a speed at which the vehicle should traverse the portion of the road. The calculating is based on the environmental conditions and the at least one vehicle parameter.

In an aspect of the invention, computer program product comprises a computer usable storage medium having readable program code embodied in the storage medium. The computer program product includes at least one component operable to: calculate a speed that a vehicle should be traveling along a portion of a roadway, based on obtained environmental conditions and at least one vehicle parameter of a vehicle traversing the portion of the roadway. The at least one component is operable to provide the calculated speed to the vehicle.

In an aspect of the invention, a computer system for calculating a vehicle's recommended speed comprises a CPU, a computer readable memory and a computer readable storage media. The computer system comprises first program instructions to obtain vehicle information. The computer system comprises second program instructions to obtain conditions outside of the vehicle. The computer system comprises third program instructions to calculate the recommended speed of the vehicle while traverse a portion of a road. The calculating is based on the obtained vehicle information, conditions outside of the vehicle, road configuration and historical information related to the portion of the road. The computer system comprises fourth program instructions to provide the recommended speed to the vehicle by displaying it on a roadside sign with additional information comprising at least one of: vehicle identification, weather conditions, road conditions, and road configuration. The first, second, third and fourth program instructions are stored on the computer readable storage media for execution by the CPU via the computer readable memory.

In an aspect of the invention, a method of deploying a system for calculating a recommended speed of a vehicle comprises: providing a computer infrastructure, being operable to: obtaining vehicle information, environmental conditions and road conditions for a portion of a road in which the vehicle is traversing; calculating the recommended speed of the vehicle for the portion of the road, the calculating being based on the obtained vehicle information, environmental conditions and road conditions; and updating the recommended speed as the vehicle is traversing the portion of the road based on a location of the vehicle on the portion of the road.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
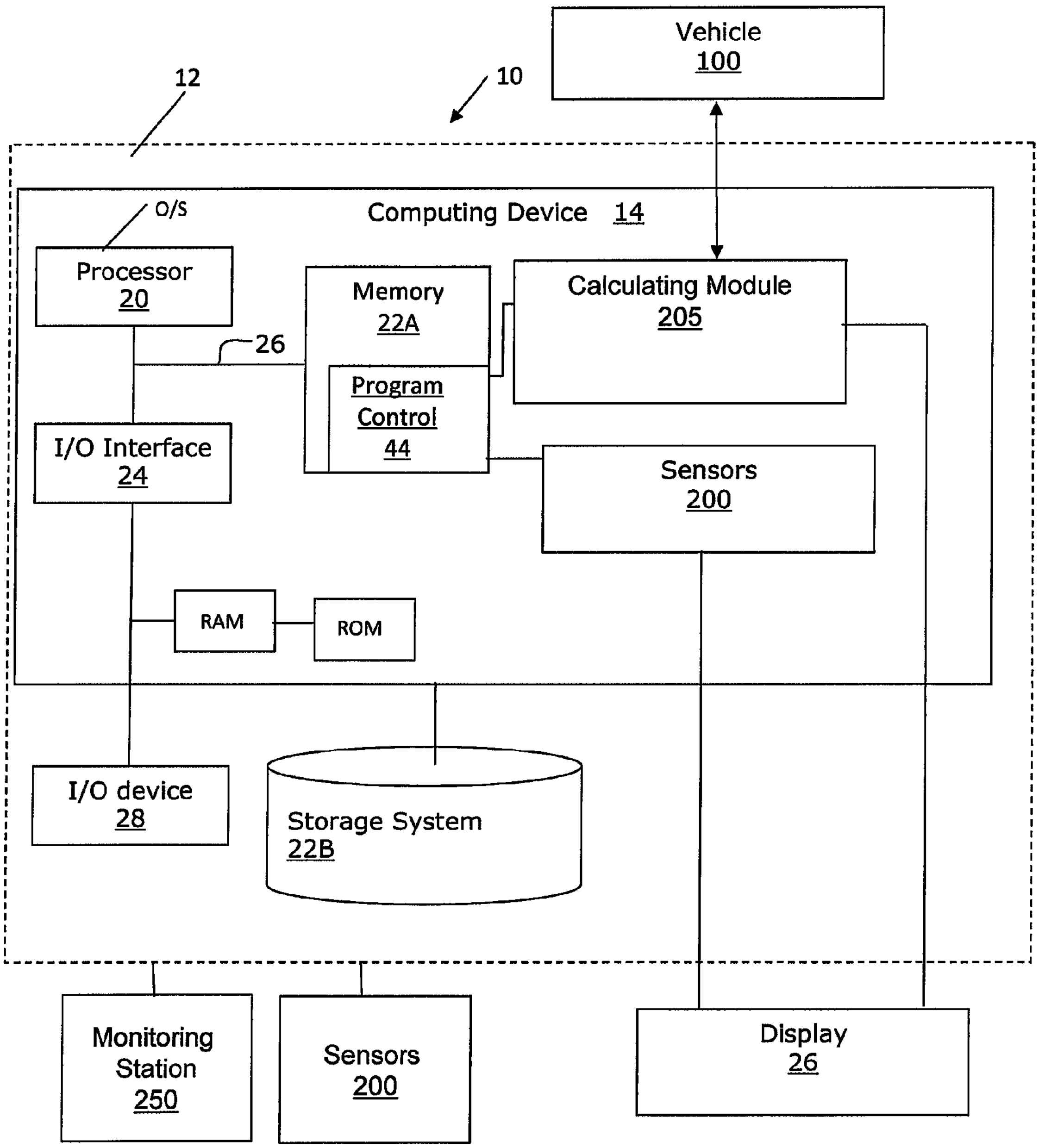
FIG. 1 is an illustrative environment for implementing steps in accordance with aspects of the present invention.

The present invention generally relates to computing systems, and more particularly, to systems and methods for providing customized information to a driver of a vehicle. More specifically, the present invention relates to computing systems, and more specifically, to systems and methods for providing intelligent road signs based on individual vehicle data and/or environmental and/or road conditions. In embodiments, the intelligent road signs can provide customized information to a driver of a vehicle. The customized information can be based on vehicle parameters, e.g., current speed, type of vehicle, tire pressure, etc., received from a vehicle, as well as sensed, detected and/or monitored conditions, e.g., road conditions, weather conditions, etc. Advantageously, using this information, the systems and methods of the present invention can customize display information to and for individual vehicles.

In embodiments, the intelligent road signs are capable of receiving information from vehicles, as well as a plurality of environmental sensors. The vehicle information can include, for example, current speed of vehicle, tire conditions, brake pad conditions, current weight of vehicle with passengers and gear, weight of trailer if any, number of axles on trailer, and/or activation of safety features, e.g., anti-lock brakes, traction control, etc., as well as a whole host of other vehicle parameters. On the other hand, the plurality of environmental sensors can include, for example, hygrometers, anemometers, thermometers, etc., as well as a host of road sensors and/or monitoring stations to determine traffic congestion, traffic speed, obstructions, e.g., fallen trees, animals on the road, etc. In embodiments, road sensors can be embedded within the roadway to determine traffic patterns, which information can be wirelessly transmitted to the intelligent road sign. The intelligent road signs can also receive information from traffic signals as well as safety personnel, e.g., police officers, emergency workers, work crews, etc.

In more specific embodiments, the systems and methods of the present invention communicate with the vehicle as well as the sensors, monitoring stations, cameras, safety personnel, etc., through a wireless communication mechanism. This wireless communication can be, for example, WiFi, RF wireless or GSM (Global System for Mobile Communications) based cellular networks, amongst others communication protocols as described herein.

By using this information, the systems and methods of the present invention can calculate and display speeds for different vehicles, even when multiple vehicles approach the sign at the same time, based on different criteria. The systems and methods of the present invention can also dynamically adjust a speed limit (or other indicator) based on parameters collected from the vehicle and other external conditions, e.g., weather, condition of road, etc. In further embodiments, the systems and methods of the present invention can provide displays which are individually customized to a vehicle, which assist the driver to visually associate the sign's display with their individual vehicle thus avoiding confusion when multiple drivers observe the road sign at the same time. In still further embodiments, the systems and methods of the present invention can transmit individualized information directly to vehicles within range of the display.

The systems and methods of the present invention can also track the vehicle through a portion of the road, e.g., curve, and store such tracked information as historical data for future use with the same and/or similar vehicles, with the contemplation of using similar road and environmental conditions. Using this historical information, the systems and methods of the present invention can, for example, extrapolate the data for other road and vehicle conditions, or use the same data to determine the appropriate speed limits for a same vehicle (based on historical experience) or other vehicles. Accordingly, the present invention provides systems and methods to dynamic adjust speed limits, based on an individual vehicle's performance and environment conditions including, for example, road conditions, weather conditions, accidents, obstructions, tire condition, brake condition, weight, etc., to provide an added degree of driving safety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM),an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. In embodiments, this illustrative environment 10 can be, for example, an intelligent road sign. In alternative embodiments, the illustrative environment 10 can be a remote infrastructure which receives information from a vehicle and environment sensors, detectors, monitors, etc., as described herein, and calculates speed using this information. The calculated speed can then be transmitted this information to a remote road sign which is equipped with communication devices, e.g., wireless or wired communications. The road sign or computing infrastructure can receive vehicle information through the same or different communication devices, depending on the configuration.

In embodiments, the road sign can be, for example, an LED sign, and the wireless communication for receiving and transmitting information can be an RF wireless communication, a WiFi wireless point to point access, or a Wifi wireless via a TCP/IP network, to name a few examples. In embodiments, an RF communication can be used for line of sight communications between the intelligent road sign and any plurality of vehicles or emergency personnel. This type of communication is traditionally less expensive than hardwiring installation, and can support transmission distance of up to 2 miles. On the other hand, WiFi wireless point to point access can operate in the 2.4 GHz range and can transmit from 1 to 11 megabytes per second. While the transmission throughput is greater, the transmission distance is less than lower frequency RF modems. Wifi wireless via a TCP/IP network can use existing TCP/IP (Ethernet) network and WiFi access points. This setup allows multiple users to communicate with the intelligent sign and/or illustrative environment 10. The present invention also contemplates that components can be hardwired to one another, e.g., hardwire the server 12 to the display 26 and any combination of remote sensors, detectors, monitors, etc.

In embodiments, the illustrative environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc. The computing device 14 also includes a display 26. In embodiments, the display 26 can be an LED or other type of electronic display implemented as an intelligent road sign of the present invention. The display 26 can be located at a roadside, within a parking facility or other location which is viewable from a vehicle 100. The display 26 can be incorporated directly into the computing device 14 or the server 12, or can be a standalone device in communication with the computing device 14 and/or the server 12.

In embodiments, a vehicle 100 can communicate information to the display 26 and/or computing device 14 and/or the server 12, depending on the particular configuration, via the use of a communication link as described above. In embodiments, the vehicle 100 can transmit a host of vehicle data via a wireless network or radio communication including, for example, vehicle speed, tire conditions (tire pressure), brake pad conditions, current weight of vehicle with passengers and gear, weight of trailer if any, number of axles on trailer, etc, as well as other vehicle parameters such as activation of anti-lock brakes or traction control, etc. This information can then be stored in the storage system 22B.

In further embodiments, the intelligent road sign (e.g., illustrative environment 10) can also include a host of sensors 200, and/or be in communication with a plurality of remote sensors 200 or monitoring stations 250. Thus, the sensors 200 can be part of the illustrative environment 10 or remote from the illustrative environment 10 (but in communication therewith). In embodiments, the sensors can be, for example, radar, which can monitor road conditions, traffic congestion, obstacles in the roadway, etc. Other sensors can include, for example, weight or speed embedded in the roadway which can monitor traffic conditions such as vehicle speed, road conditions and traffic patterns. Additional sensors can include sensors to monitor the weather such as, for example, temperature sensors (thermometer), wind sensors (anemometer), and moisture sensor (hygrometer).

In additional embodiments, cameras or video equipment (also represented at reference numeral 200) can be used to monitor road conditions, traffic congestion, obstacles in the roadway, as well as identify vehicles, e.g., identify a vehicle by capturing its license plate and comparing such information to a look up table in a centralized database. These cameras or video equipment can communicate with the computing device 14 by wired or wireless communications, as discussed herein. Moreover, the illustrative environment 10 may be in communication with traffic signals and can additionally receive information from emergency personnel, work crews, etc. Similar to the vehicle information, the information received from the sensors, cameras, etc. can also be stored in the storage system 22B.

The computing device 14 also includes a processor 20 which executes computer program code (e.g., program control 44), which can be stored in the memory 22A and/or storage system 22B. Moreover, in accordance with aspects of the invention, the program control 44 controls a calculating module 205, e.g., the processes described herein. The module 205 can be implemented as one or more program code in the program control 44 stored in memory 22A as separate or combined modules. Additionally, the module 205 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the module 205 can use the information received from the vehicle 100, sensors 200, traffic signals, cameras, and/or emergency personnel, work crews, etc. to calculate a safe speed for the vehicle before or as it traverses a portion of the roadway. By way of example, taking into consideration the road conditions, type of vehicle, vehicle condition, and current traffic patterns and weather conditions, the systems and methods of the present invention can calculate that the vehicle should approach a curve in the road at a slower speed, e.g., 55 miles per hour, compared to a straight portion of the roadway.

Illustratively, the systems and methods of the present invention can also take into consideration historical information using similar or same vehicles, as well as any specific laws or other influences which may impact the way speed limits are calculated for a particular road condition. In such an example, a vehicle may be entering a curve at 25 mph, when they begin to slip (trajectory) as determined by, e.g., radar or activation of traction control. The systems and processes of the present invention will then use this information to inform subsequent cars of similar model and make to enter the curve at a slower speed, taking into consideration any additional environmental factors.

Once the calculation is performed by the module 205, display information can then be provided to the display 26. This displayed information may include the posted speed limit, vehicle identification, as well as a host of other informative information. This other informative information may include current road conditions, e.g., wet, ice, etc., as well as traffic conditions, e.g., congestion, road condition, etc. This informative information may also include, for example, the state of a traffic signal, e.g., green or red light, etc.

In additional or alternative embodiments, the displayed information can also be communicated directly to an onboard vehicle system to be seen and/or heard by the vehicle driver. In this way, for example, if the sensors detect that the vehicle has not slowed down enough, the systems and methods of the present invention can provide a visual and/or audible message to the vehicle. Also, in embodiments, to ensure that the vehicle is traveling at a safe speed, vehicle monitoring stations 250 can be placed throughout the route of the vehicle at a certain section of the road. The vehicle monitoring stations 250 can also collect information such as slippage, skidding, ABS activation, traction control, slowing down or speeding up, etc. of the vehicle. By using this information, the vehicle monitoring stations 250 can transmit speed information to the onboard vehicle system to be seen and/or heard by the vehicle driver, via the calculations provided by the module 205.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
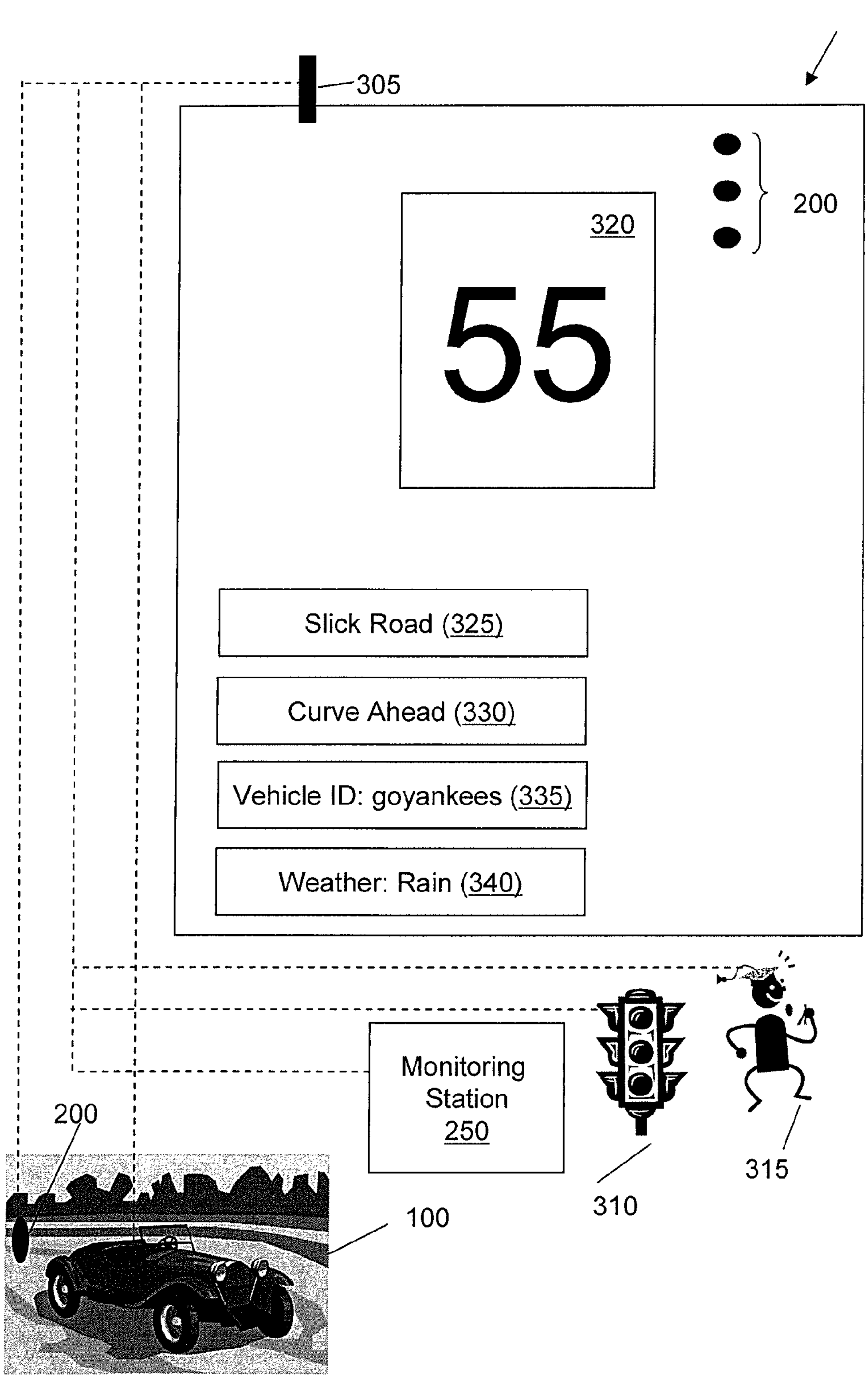
FIG. 2 shows an illustrative example of an intelligent road sign in accordance with aspects of the present invention.

FIG. 2 shows an illustrative example of the intelligent road sign 300. In this illustrative example, the intelligent road sign 300 is a self contained system, where all of the logic, display, etc. is provided in a single unit. That is, in the implementation of FIG. 2, the environment 10 (e.g., including the sensors 200, calculating module 205, display 26, etc.) is housed in a single unit (i.e., intelligent road sign 300). More specifically, in this implementation, the intelligent road sign 300 can include the display 26 and a host of sensors 200 to determine vehicle parameters and environmental conditions. The intelligent road sign 300 can also include an antenna (e.g., transceiver) 305 to receive information from the vehicle 100 and send information to the vehicle 100. The antenna 305 can also be used to communicate with a central server, e.g., service provider. In addition, the antenna 305 may be used to receive information from any of the sensors 200 (whether on the display 26 or embedded in the road, etc.), monitoring stations 250, traffic signals 310, and emergency personnel or road crews 315, for example. The display 26 of the intelligent road sign 300 may include information such as, for example, (i) optimal vehicle speed taking into account the above noted variables 320;

(ii) road conditions 325;

(iii) road configuration (e.g., curve ahead) 330;

(iv) identification of the vehicle, e.g., goyankees, 335. The identification of the vehicle can also be a picture of the vehicle, as captured by a camera; and/or (v) current weather conditions 340.

Figure 3:
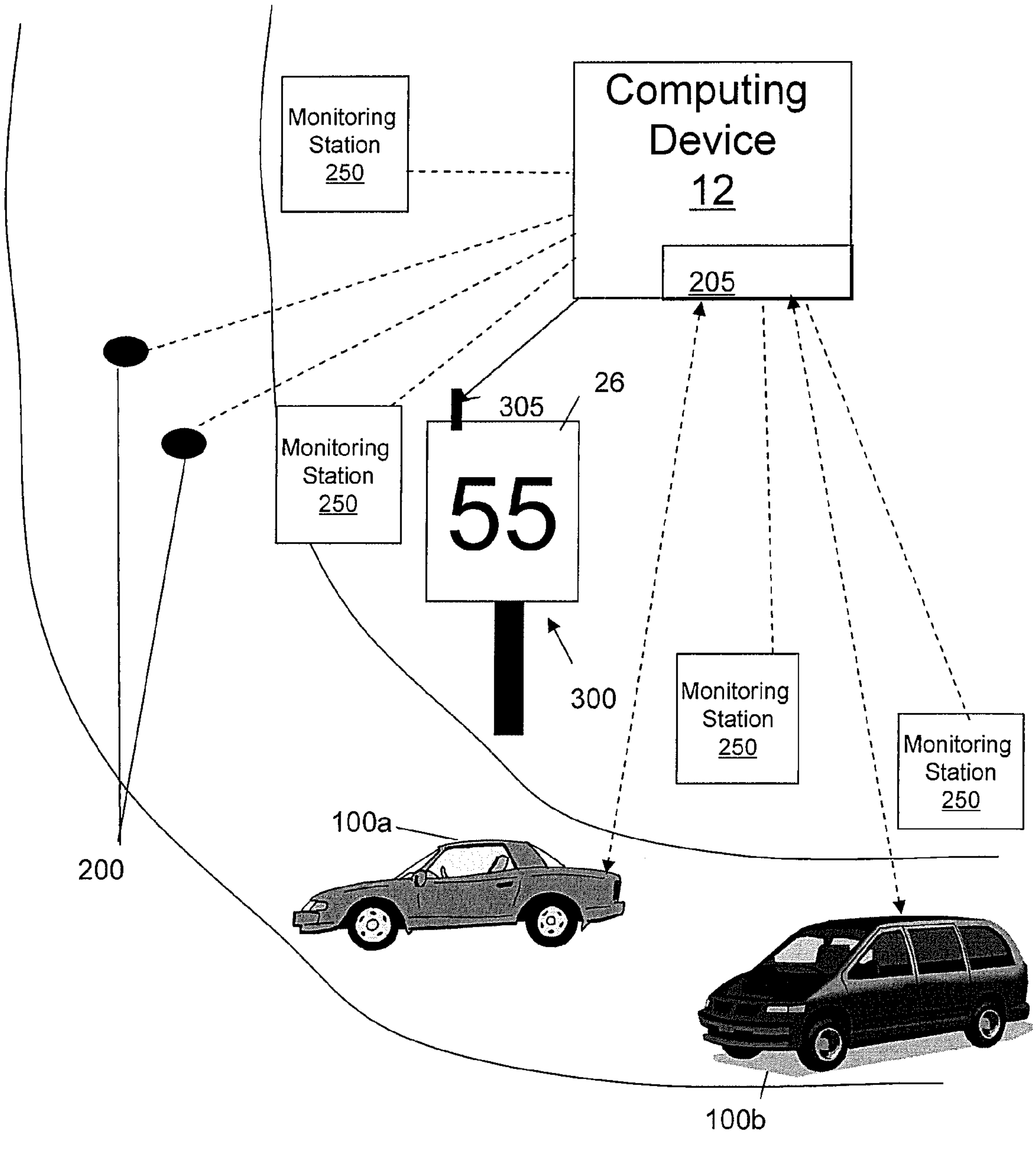
FIG. 3 shows another illustrative example of the intelligent road sign receiving information from a central service, in accordance with aspects of the present invention.

FIG. 3 shows another illustrative example of the present invention. In particular, FIG. 3 shows an illustrative example of the intelligent road sign 300, which is a separate unit from the computing system 12. In this illustrative example, the intelligent road sign 300 includes the display 26 and an antenna (e.g., transceiver) 305, and may also include sensors 200 as discussed herein (e.g., to monitor weather conditions or cameras to identify vehicles, road conditions, etc.). The computing system 12, on the other hand, includes the calculating unit 205 and other computer components as discussed in FIG. 1). In this example, a plurality of sensors 200 and monitoring stations 250 are provided along the road. The plurality of sensors 200, monitoring stations 250 and vehicles 100*a*, 100*b* transmit information to the computing system 12. This information can be, for example, vehicle parameters, speed, weather conditions, etc. as already discussed herein. This information is then used by the computing systems and more particularly by the calculating module 205 to calculate safe speeds of the vehicle based on vehicle information and other environmental factors. The speed information and/or other alerts can then be transmitted from the computing system 12 to the display 26 and/or directly to the vehicles 100*a*, 100*b*.

In this configuration, the displayed information can be customized for each vehicle 100*a*, 100*b*. For example, the information provided to the car 100*a* can be different than that provided to the van 100*b*. More specifically, the calculating module 205 can calculate a faster speed for the car 100*a* than the van 100*b* based on many different factors such as, the car 100*a* has tires which are capable of handling a curve at higher speeds compared to the van 100*b*. Other factors may include, for example:

(i) the van 100*b* weighs more than the car 100*a;*

(ii) the van 100*b* has a higher center of gravity than the car 100*a;*

(iii) the van 100*b* is following the car 100*a*, and a dangerous situation may arise if the van 100*b* is going fasting than the car 100*a*, etc.; and/or (iv) the car 100*a* is equipped with safety equipment not present in the van 100*b*, e.g., anti-lock brakes, traction control, etc.

In additional embodiments, due to the fact that there are many different monitoring stations 250 and sensors 200 along the route of travel, vehicle information can constantly be updated to ensure that the vehicle is within safe speed limits based on many different factors discussed herein. The updated speed can be provided as the vehicle is traversing a different portion of the road based on a location of the vehicle on the portion of the road, in addition to any combination of factors described herein. In fact, even after the vehicles 100*a*, 100*b* have passed the display 26, updated information can still be communicated directly to the vehicles 100*a*, 100*b*. This information can be transmitted directly from the computing device 12, via a wireless network/radio system.

Flow Diagram

Figure 4:
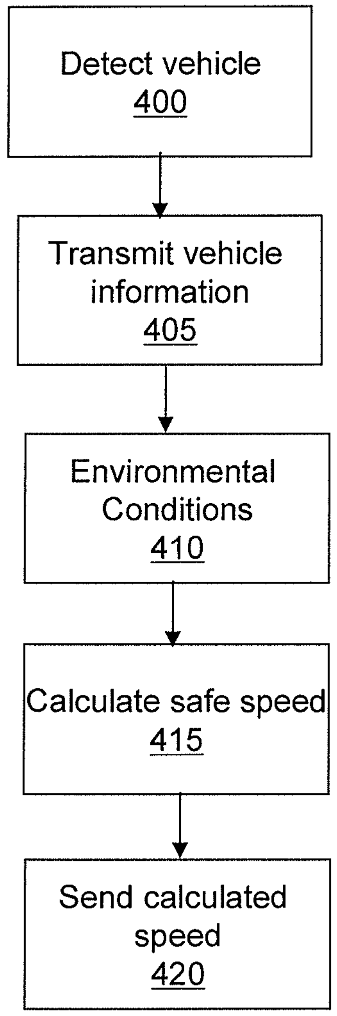
FIG. 4 depicts an exemplary flow for a process in accordance with aspects of the present invention.

FIG. 4 shows an exemplary flow for performing aspects of the present invention. The steps of FIG. 4 may be implemented in the environment of FIGS. 1-3, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process in accordance with aspects of the present invention. At step 400, a monitoring station, e.g., sensor, detects that a vehicle is at a certain location on the road. This location can be, for example, entering a curved portion of the road. At step 405, the vehicle can transmit vehicle information to the system of the present invention, e.g., intelligent road sign. This information can be any of the information already discussed herein. At step 410, the system of the present invention receives environmental conditions, e.g., weather and road conditions, amongst others. At step 415, the systems and processes of the present invention calculate a safe speed of the vehicle and transmit this information to the display and/or directly to the vehicle.

As already discussed herein, the information received in steps 405-415 can be used to calculate a safe speed. In addition, historical information of the road conditions under certain weather conditions, certain lighting conditions, e.g., night time driving compared to day time driving, with certain types of vehicles with certain parameters, can also be taken into consideration when calculating the safe speed of the vehicle. Moreover, the systems and processes of the present invention can also access and use information concerning municipality, state or federal data to calculate safe speeds based on slowest speed for the vehicle in a group by predetermined criteria, time of day, accident history, etc.

At step 420, the calculated speed for the vehicle can then be sent to the display and/or directly to the vehicle. The systems and processes of the present invention can also display additional information such as weather and road conditions, vehicle identification, etc. In further embodiments, if there is a cluster of vehicles, e.g., a plurality of vehicles traveling close together, the systems and processes of the present invention can display individual ratings or make a collective determination as to a speed for the entire cluster and display such "cluster" speed.

The steps of 405-420 can be repeated. For example, as a vehicle is entering a turn, the systems and processes of the present invention can continue to obtain vehicle information and use such information to provide an updated speed. This additional information can be tire slippage, skidding, anti-lock brake activation, activation of traction control, slowing down or speeding up of the vehicle, change in road conditions, etc. During this or other processes, the system of the present invention can identify the vehicle and also detect road obstructions such as a fallen tree, etc. by use of cameras and/or video streams. Law enforcement or emergency personnel can also communicate with the system during any of the above steps to provide updated information, e.g., a vehicle has become disabled and the oncoming vehicles should reduce their speed.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

EXAMPLES OF USE

The following scenarios are disclosed to show exemplary illustrations implementing aspects of the present invention. The following scenarios are provided for illustration purposes only, and are not to be considered limiting examples of the present invention. In each of the below scenarios, the systems and processes of the present invention will calculate a safe speed for a vehicle.

Scenario 1:

The systems and processes of the present invention, e.g., sensors and/or monitoring stations monitor the vehicles statistics continuously through a curve in the road. The systems and processes of the present invention will be monitoring any signs of safety issues. The system will do this for every vehicle passing through the curve and then use that data to adjust the recommendations for future vehicles.

So, for example, if the system informs a minivan that the safe speed for the upcoming cloverleaf is 20 mph and its raining and the minivan actually starts to slip (measured by lateral movement by radar or antilock brake activation) then it will adjust the displayed speed limit to 17 mph for future cars of similar design that is a predetermined distance or time, e.g., 30 seconds, away from entering the cloverleaf. If a sports car is told 20 mph and it starts increasing speed in the curve that could be an indication that the displayed speed limit could be increased to 25 mph, etc.

Scenario 2:

Two vehicles of different make and model are approaching the same curve in the road. The systems and processes of the present invention will detect that the first vehicle is a small sports car that can traverse the curve at 35 MPH and there is no abnormal weather or obstructions. The second vehicle, though, is a truck pulling a 5,000 pound boat. The systems and processes of the present invention will calculate the safe speed for this vehicle at 20 MPH in order to take the curve safely. This calculation is based on the weight of the vehicle, a type of vehicle and the use of a trailer. Also, other environmental conditions may be taken into account.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:

obtain one or more parameters of a vehicle;

obtain environmental conditions outside of the vehicle;

calculate a speed in which the vehicle should traverse a portion of a road, the calculating being based on the one or more parameters of the vehicle and the environmental conditions outside of the vehicle;

transmit the calculated speed to an electronic road display and the vehicle for purposes of displaying the calculated speed; and transmit other information to the electronic road display for purposes of displaying the other information.

2. The method of clam 1, wherein the environmental conditions include at least one of a road condition in which the vehicle will traverse and weather conditions.

3. The method of claim 1, wherein the one or more parameters of the vehicle includes at least one of current speed, tire conditions, brake pad conditions, current weight of vehicle, weight of trailer if any, number of axles, and safety features of the vehicle.

4. The method of claim 1, wherein the environmental conditions are obtained from one or more sensors and cameras.

5. The method of claim 4, wherein the one or more sensors include at least one of a radar, weather sensors, and road condition sensors, and the cameras include video cameras, each of which provide information to a calculating unit used to calculate the calculated speed.

6. The method of claim 1, wherein the calculating of the speed is further based on at least one of:

municipal, state and/or federal speed limits for a portion of the road in which the vehicle is traversing;

historical information associated with the portion of the road in which the vehicle is traversing; and information obtained by user input.

7. The method of claim 1, wherein the other information is at least one of vehicle identification, road conditions, weather conditions and road configuration.

8. The method of claim 1, wherein the calculated speed is transmitted directly to the vehicle.

9. The method of claim 1, wherein a service provider at least one of creates, maintains, deploys and supports the computer infrastructure.

10. The method of claim 1, wherein steps of claim 1 are provided by a service provider on a subscription, advertising, and/or fee basis.

11. A system implemented in hardware, comprising:

one or more sensors which are configured to obtain environmental conditions;

one or more transceivers which are configured to obtain at least one vehicle parameter of a vehicle traversing a portion of a road;

a calculating unit which is configured to calculate a speed in which the vehicle should traverse the portion of the road, the calculating being based on the environmental conditions and the at least one vehicle parameter; and an electronic road display which is configured to receive and display the calculated speed.

12. The system of claim 11, wherein the sensors are configured to obtain weather conditions, vehicle trajectory and road conditions.

13. The system of claim 11, further comprising monitoring stations for obtaining weather conditions, vehicle trajectory and road conditions used to calculate the calculated speed.

14. The system of claim 11, further comprising a transmitting unit to transmit the calculated speed directly to the vehicle.

15. The system of claim 11, wherein the calculating unit calculates the speed in which the vehicle should traverse the portion of the road using any one of:

municipal, state and/or federal speed limits for the portion of the road in which the vehicle is traversing;

historical information associated with the portion of the road in which the vehicle is traversing; and information obtained by user input.

16. The system of claim 11, wherein the calculating unit is provided on a central service server and the one or more sensors are remotely positioned from the central service server.

17. The system of claim 11, wherein the calculating unit is provided with the electronic road display for displaying the calculated speed.

18. The system of claim 11, wherein the calculating unit periodically updates the calculated speed and provides the updated calculated speed to the vehicle, as it is traversing different portions of the road.

19. A computer program product comprising a computer usable storage medium having readable program code embodied in the storage medium, the computer program product includes at least one component operable to:

calculate a speed that a vehicle should be traveling along a portion of a roadway, based on obtained environmental conditions and at least one vehicle parameter of a vehicle traversing the portion of the roadway; and display the calculated speed on an electronic road display to provide the calculated speed to an operator of the vehicle.

20. The computer program product of claim 19, further operable to calculate the speed based on historical information previously obtained for calculating speed for at least one of the vehicle and other vehicles.

21. A computer system for calculating a vehicle's recommended speed, the system comprising:

a CPU, a computer readable memory and a computer readable storage media;

first program instructions to obtain vehicle information;

second program instructions to obtain conditions outside of the vehicle;

third program instructions to calculate the recommended speed of the vehicle while traverse a portion of a road, the calculating being based on the obtained vehicle information, conditions outside of the vehicle, road configuration and historical information related to the portion of the road;

fourth program instructions to provide the recommended speed to the vehicle by displaying it on a roadside sign with additional information comprising at least one of: vehicle identification, weather conditions, road conditions, and road configuration, wherein the first, second, third and fourth program instructions are stored on the computer readable storage media for execution by the CPU via the computer readable memory.

22. The computer system of claim 21, further comprising fifth program instructions to provide the recommended speed directly to an occupant of the vehicle.

23. A method of deploying a system for calculating a recommended speed of a vehicle comprising:

providing a computer infrastructure, being operable to:

obtaining vehicle information, environmental conditions and road conditions for a portion of a road in which the vehicle is traversing;

calculating the recommended speed of the vehicle for the portion of the road, the calculating being based on the obtained vehicle information, environmental conditions and road conditions;

updating the recommended speed as the vehicle is traversing the portion of the road based on a location of the vehicle on the portion of the road; and transmitting the recommended speed and the updated recommended speed to an electronic road display for display thereon.

24. The method of clam 1, wherein the vehicle is one of a plurality of vehicles and the electronic road display provides a customized calculated speed for each of the plurality of vehicles and each of the plurality of vehicles is identified by a unique vehicle ID.

* * * * *

UNITED STATES PATENT AND TRADEMARK OFFICE

CERTIFICATE OF CORRECTION

| | |
|---|---|
| PATENT NO. | : 8,880,237 B2 |
| APPLICATION NO. | : 13/734312 |
| DATED | : November 4, 2014 |
| INVENTOR(S) | : Gregory J. Boss et al. |

It is certified that error appears in the above-identified patent and that said Letters Patent is hereby corrected as shown below:

On the Title Page

Item (72), the last inventor's name should appear as follows:

John E. Moore, Jr.

Signed and Sealed this
Twenty-sixth Day of September, 2017

Joseph Matal

Joseph Matal
*Performing the Functions and Duties of the*
*Under Secretary of Commerce for Intellectual Property and*
*Director of the United States Patent and Trademark Office*